Feb. 2, 1971   F. GRETHER ET AL   3,559,244
PRESS FOR MAKING OBJECTS OF EQUAL WEIGHT
Filed June 27, 1968   3 Sheets-Sheet 1
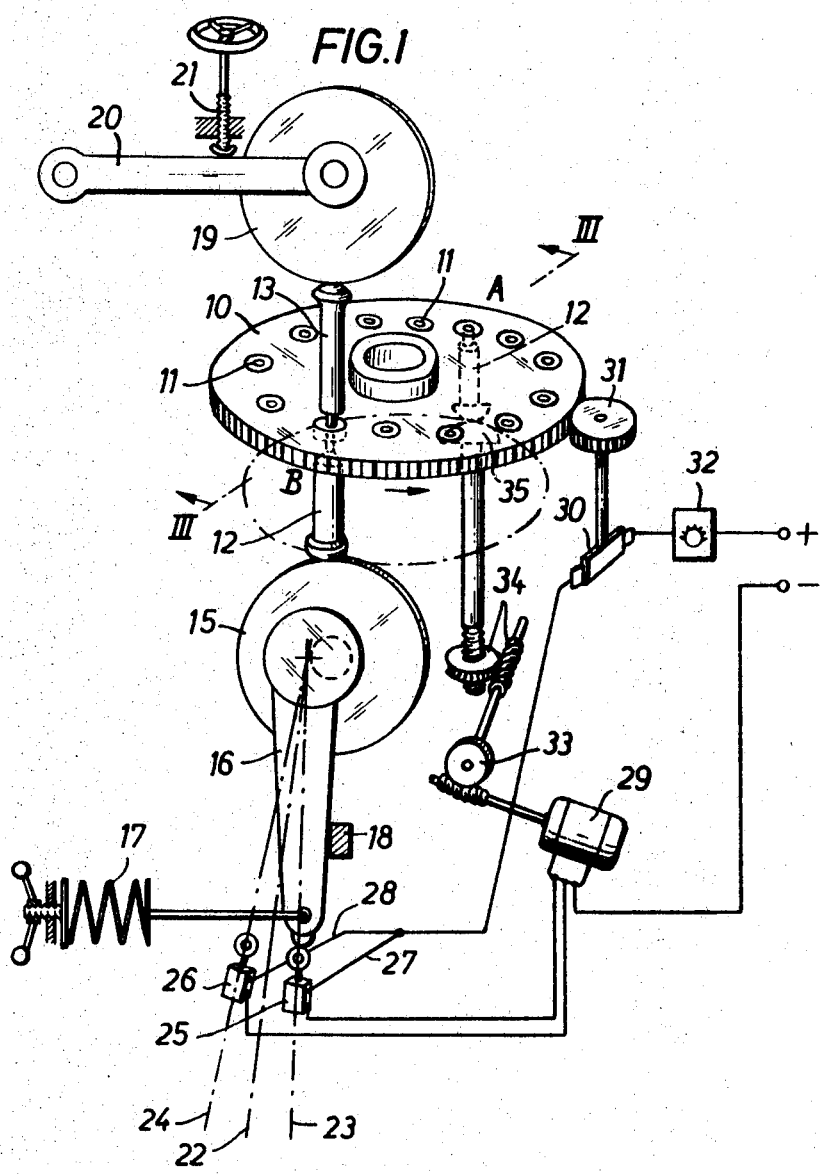
INVENTORS
FRITZ GRETHER, HELMUT JANSON
BY
Michael S. Striker
Attorney

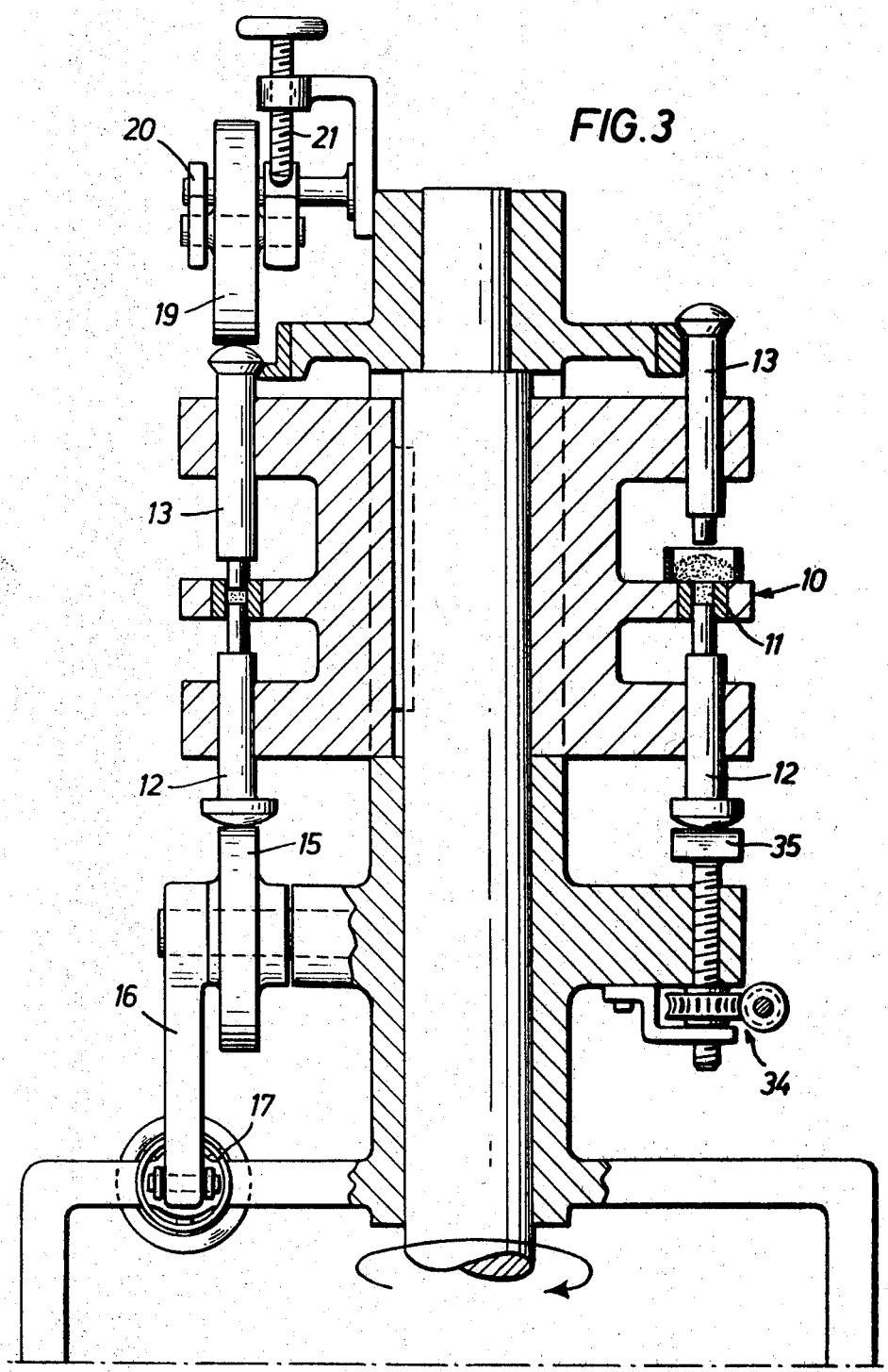

3,559,244
PRESS FOR MAKING OBJECTS OF EQUAL WEIGHT
Fritz Grether, Cologne-Neu Ehrenfeld, and Helmut Janson, Cologne-Heimersdorf, Germany, assignors to Kilian & Co. G.m.b.H., Cologne-Niehl, Germany
Filed June 27, 1968, Ser. No. 740,723
Claims priority, application Germany, June 29, 1967,
K 62,677
Int. Cl. B29c 3/06
U.S. Cl. 18—20                                              9 Claims

ABSTRACT OF THE DISCLOSURE

The volume of the mold chambers of a tabletting press is adjusted in accordance with the measured compressing pressure so that the same amount of a powdery substance is filled into the mold chambers irrespective of its consistency whereby tablets of equal weight are pressed.

BACKGROUND OF THE INVENTION

In the manufacture of tablets pressed of powdery or granular substances, a mold chamber adjusted to a specific volume is filled with the powder at a feeding station, and transported to an operating station where the powder in the mold chamber is compressed by two press members moving in the mold chamber toward each other. In order to maintain a constant and equal weight of the pressed tablets, the feeding means by which the powder is filled into the mold chambers are controlled by highly sensitive control means which cause the dispensing of accurately measured amounts into the mold chambers. The adjustment of the mold chambers is usually effected by adjustment of a counterpressure member projecting into a matrix bore and forming with the same a mold chamber which is open on top, where the powdery substance is filled in. Excess powder is removed by a suitable stripper. The matrix bore provided in a turnable die plate pass successively through the feeding station and the operating station where the counterpressure member and a presser member are moved toward each other in the matrix bore for compressing the powder.

However, it has been found that irrespective of the fact that the volume of the mold chamber is held absolutely constant at the feeding station, the weight of the pressed tablets varies. This is due to the fact that the powdery or granular substance which is filled into successive mold chambers does not have an absolutely constant consistency. However, even minor variations of the granular texture or flow properties of the particles forming the substances, have the result that the weight of the amount of substance filled into each mold chamber is not constant, irrespective of the constant volume of the mold chambers, so that the weight of the pressed tablets varies.

In accordance with the prior art, the volume of the mold chambers is adjusted when weighing of the tablets shows weight variations. This requires a continuous control of the weight of the finished tablets, and when overweight or underweight is found, the volume of the mold chambers is adjusted.

The arrangement of the prior art cannot avoid that tablets of different weight are produced, and even if an adjustment is carried out, another irregularity of the consistency of the powdery substance may again cause the production of tablets having an incorrect weight.

SUMMARY OF THE INVENTION

It is one object of the invention to overcome this disadvantage of the prior art, and to provide a press for making objects of equal and constant weight of a powdery or granular substance whose consistency varies.

Another object of the invention is to automatically adjust the volume of the mold chambers when the weight of the charge filled into the mold chambers varies due to variations of the consistency of the powdery substance.

Another object of the invention is to sense and measure the pressure required for compressing the substance filled into each mold chamber, and to adjust the volume of the mold chambers accordingly.

The present invention is based on the recognition of the fact that the pressure required for compressing a charge of a powdery substance is constant if the weight of the charge, and consequently the weight of the compressed tablets is constant. However, the pressure is entirely independent of the consistency and texture of the substance. In other words, it is immaterial whether the substance is more or less granular or powdery, or whether its flow properties vary within certain limits. On the other hand, these properties of the substance influence the weight of the amount of each charge of the substance which can be filled at the feeding station into a mold chamber.

In accordance with the invention, and with the above objects in view, the weight of pressed tablets or other objects is maintained constant by variation of the volume of the charge filled into a mold chamber depending on the pressure required for compressing the powdery substance into a tablet or other hard object.

One embodiment of the invention comprises mold means having a plurality of mold chambers and including adjusting means for varying the volume of the chambers, feeding means for feeding a compressible substance into the mold chambers, press means for compressing the substance in successive mold chambers with a pressure depending on variations of the amount of the substance, pressure-responsive sensing means for measuring the pressure, and control means controlled by the sensing means to operate the adjusting means.

The arrangement is such that the volume of the mold chambers is increased or reduced, respectively, when measured low and high pressures indicate, respectively, an insufficient and an excess amount of the substance in the mold chambers.

Due to the adjustment of the volume of the mold chambers in accordance with the actually applied compressing pressure, the amount of the substance has the same weight so that compressed objects of equal weight are formed.

Preferably, the mold means includes a turnable die plate having bores therethrough, and the adjusting means include a counterpressure member projecting into each bore and forming in the same the mold chamber. The control means include a motor connected by a transmission with the counterpressure members for moving the same forward and backward in the bores for varying the volume of the mold chambers. The press means include a press member movable into the other end of the bores and being operated for compressing the substance in the mold chambers.

At the operating station, where the press member is in the open end of the mold chamber, the counterpressure member at the other end of the same is not operated but is permitted to yield against the action of biasing means if the pressure exceeds a certain minimum.

At a desired pressure, corresponding to a certain weight of the charge in the mold chamber and of the finished tablet, the counterpressure member displaces a sensing member loaded by the biasing means to a normal position. If the compressing pressure is reduced, indicating an insufficient charge in the mold chamber, the force of the biasing means cannot be overcome, and the sensing member remains in a first position. If the charge is too great, the pressure acting on the counterpressure member is increased and the same displaces the sensing member against the action of the biasing means to a second position. First and second control elements are actuated by the sensing member in the first and second positions respectively and effect adjustment of the counterpressure member at the feeding station for adjustment of the volume of the following charges which are to be compressed.

The control elements may be reversing switches connected into the circuit of the motor whose shaft is connected by transmission means to the counterpressure members which are either moved farther into the matrix bores for reducing the volume of the mold chambers, or retracted in the same for increasing the volume.

In the above-described embodiment of the invention substantial masses have to be moved so that the press cannot be operated at a very high speed. In a modified construction of the invention, which is advantageously applied to high-speed tabletting presses, the pressure required for compressing the tablets is measured by a stress gauge attached to the frame of the press on which the press member and counterpressure members are mounted. Since the frame is subjected to a stress which is equal to the compressing pressure, the stress gauge measures the compressing pressure and varies its resistance accordingly so that a current flowing therethrough is reduced or increased. The current is measured and the corresponding higher or lower indication of the measuring instrument effects the operation of two reversing switches by which the control motor is reversed for increasing or reducing the volume of the mold chambers.

In a further modification of the invention, the compressing pressure is measured by a piezoelectric device which influences the reversing switches of the control motor.

The novel features of the invention which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a fragmentary perspective schematic view illustrating one embodiment of the invention;

FIG. 3 is a sectional view in direction of the arrows III—III.

DESCRIPTION OF THE PREFERRED EMBODIMENTS

Figure 1A:
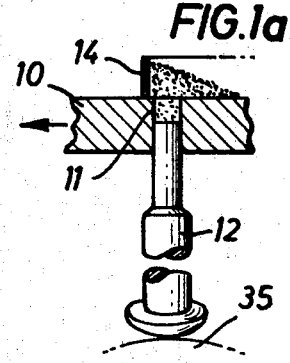
FIG. 1a is an elevation, partially in section, illustrating a detail of the embodiment of FIG. 1.

The embodiment of FIG. 1 is applied to a conventional tabletting press which is only partly shown, parts of the press which have no bearing on the present invention being omitted for the sake of simplicity. A circular die plate 10 having a peripheral gear is rotated by shaft about its center so that matrix bores 11 are stepwise moved between a feeding station A and an operating station B. Matrix bores 11 are uniformly spaced along a circular row, and are closed at the bottom by counterpressure members 12 which project into bores 11 to form mold chambers in the same, as best seen in FIG. 1a.

During rotation of the matrix plate 10, the mold chambers are filled at the feeding station A by a powdery or granular substance which is piled up on each bore by a suitable chute so that the bore is completely filled above the end face of the counterpressure member 12. Depending on how deeply counterpressure member 12 projects into the bore, the volume of the mold chamber is varied. Excess powder is wiped off the top face of die table 10 by a stripper 14, see FIG. 1a.

During further turning movement of matrix plates 10, the filled mold chambers are transported to the operating station B. Presser members 13, and counter presser members 12 are guided by guide means during this movement, station B. Presser members 13, and counterpresser members 12 at the same level by which the volume of the mold chambers is determined. The upper and lower guide means of presser members 13 and counterpressure members 12 converge so that the powder charge in each mold chamber is gradually compressed.

At the operating station B, counterpressure member 12 is guided onto a pressure roller 15 which is eccentrically mounted on a sensing lever 16 which is biassed by a spring 17 whose force can be manually adjusted. At the same time, the presser member 13 engages a pressure roller 19 mounted on a lever 20 whose position can be adjusted by a manually operated spindle 21 surrounded by stationary nut. The pressure of counterpressure member 12 on pressure roller 15 during the compression of the powder charge exerts a torque on sensing lever 16 so that the same is urged to turn in clockwise direction against the action of the biassing spring 17. When no pressure, or a minimum pressure, acts on counterpressure roller 15, the torque cannot overcome the force of spring 17, and sensing lever 16 abuts a stationary stop 18.

When the right amount of powder is fed into the mold chambers, the compression pressure exerted by press member 13 and counterpressure member 12 produces such a torque that the sensing lever 16 is displaced from the position 23 to the angular position 22 in which tablets having the correct weight are produced. In the event that the amount of the powder charge was too high, a higher compression pressure prevails, which is transmitted by counterpressure member 12 to pressure roller 15 of the sensing lever 16 so that the same is turned against the action of spring 17 to the position 24. Control elements in the form of reversing switches 25 and 26 are operated by the sensing lever 16 in the position 23, indicating that the charge is too small, and in the position 24, indicating that the charge is too great. Reversing switches 25 and 26 are connected into the circuit branches 27 and 28 of a circuit which is connected to a voltage source and includes a control motor 29 whose direction of rotation is reversed when one or the other of switches 25, 26 is actuated by the sensing lever 16.

A rotary control switch 30 is also connected into the circuit in series with reversinng switches 25 and 26, and has an actuator shaft carrying a gear 31 meshing with the peripheral gear of die plate 10. The arrangement is such that the switch turns an angle of 180°, when the die plate 10 turns angular steps for placing the mold chambers successively at the feeding and operating stations.

The circuit of control motor 29 is closed by control switch 30 once during each pressing stroke of presser member 13. A short time relay 32 is connected in series with control switch 30 and has the effect that a current pulse of short duration flows through the control motor when the maximal compression pressure is produced at the operating station B.

Depending on the position of the sensing lever 16 and on the actuation of switch 25 or switch 26, control motor 29 will run in one or the other direction for a short period of time.

Two worm gear transmission means 33 and 34 connect the motor shaft with the lower guide means 35 on which the heads of the counterpressure members 12 are guided.

If switch 25 is closed, indicating that the last pressed tablet is too light, guide means 35 is slightly lowered by the motor running in one direction so that the counterpressure member is slightly retracted at the feeding station, serving as an adjusting means for increasing the volume of the mold chamber.

If the pressure at the operating station is so high that sensing lever 16 actuates reversing switch 26, overcoming the force of spring 17, the motor runs in the opposite direction, guide means 35 is raised by transmission means 33, 34 and the volume of the molding chambers is reduced by the counterpressure members 12.

The volume of each mold chamber is automatically adjusted at the feeding station A depending on the maximum compression pressure produced during the compression of the powder into a hard tablet at the operating station B.

If the compression pressure has a normal value, indicating proper weight of a tablet, the compression force produces a torque on sensing lever 16 which displaces the same only to the intermediate position 22 so that none of the reversing switches 25 and 26 is closed so that the volume of the mold chambers is not adjusted. This position, both reversing switches disconnect control motor 29 from the source of voltage.

It will be understood that the adjustable counterpressure members serve as adjusting means for adjusting the volume of the mold chambers under the control of control means 29, 33, 34, 35, and control elements 25 and 26. A feeding means including member 14 fill the adjusted mold chambers 11 with a powdery or granular substance whose amount influences the compression pressure which is sensed by the sensing means 16, 17, 18 so that the same assume a position operating the control elements 25, 26 of the control means when too high or too low pressure indicates an insufficient or an excess amount of the substance in the mold chambers.

Due to the provision of the control switch 30 which is operated in accordance with the stepwise movement of the mold means 10, 11, control motor 29 is intermittently energized. If a variation of the compression pressure indicates an incorrect weight of the finished tablets, several energizing pulses produced during the pressing of successive tablets may be required to adjust the volume of the molding chambers at the feeding station to a new desired volume which will result in the predetermined weight of the finished tablets at the momentary consistency of the compressed substance.

It would also be possible to operate the control motor continuously in one or the other direction of rotation until the volume of the mold chambers has been adjusted to a volume resulting in correct weight of the finished tablets.

Since there is a certain time delay between the filling of the mold chambers at the feeding station A and the pressing of the tablets at the operating station B, the control cycle of this modification can be interrupted for a suitable period after a time of, for example 1 to 10 seconds, so that when the compression pressure is again sensed, the compressed tablet is produced of a charge filled into a mold chamber whose volume has been adjusted.

Figure 2:
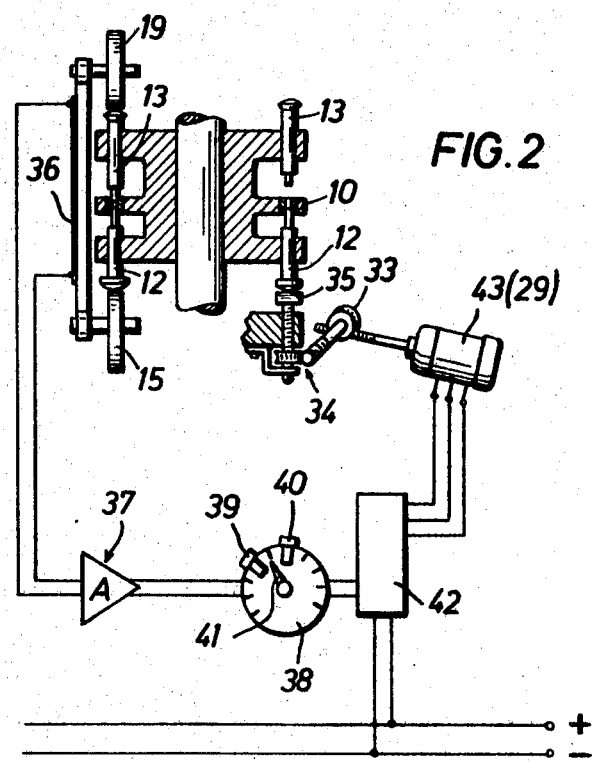
FIG. 2 is a fragmentary schematic illustrating a modified arrangement of the sensing means of the invention which may be applied to the press illustrated in FIG. 1.

The modification schematically illustrated in FIG. 2 is particularly suitable for high-speed presses. A strip-shaped stress guage 36 is secured to a frame portion of the press connecting the upper frame part carrying press means 20, 13 with the lower frame part carrying counterpressure members 12 and sensing means 15, 16 so that the stress gauge is deformed in acordance with the stress exerted on the frame by the compression pressure. The electric resistance of the stress gauge is varied depending on the stress and pressure. A current flowing through the stress gauge 36 in FIG. 2, is amplified by the amplifier 37 and supplied to a sensing and measuring device 38 whose indicator 41 is moved into contact with contacts 39 and 40 when the maximum and minimum compression pressure, and corresponding frame stress, prevail. Contacts 39 and 40 may control relays for operating reversing switches, or the shaft of indicator 41 may be connected to a switching device 42 including reversing switches corresponding to switches 25 and 26 by which the control motor 43 is energized and reversed when the position of indicator 41 indicates too high or too low compression pressure. Control motor 43 operates through schematically indicated transmission means the guide means 35 by which the position of the counterpressure members 12 in the die bores 11 is adjusted for varying the volume of the mold chamber.

If indicator 41 only moves to contact 39, control motor 43 rotates in one direction so that the volume of the mold chambers is increased at the feeding station A by slight retraction of the counterpressure members. Conversely, if the indicator 41 moves to contact 40, the counterpressure members 12 are moved into the die bores to reduce the volume of the mold chambers.

In a further modified embodiment of the invention, the compression pressure at the operating station is measured by piezoelectric means by which the control means 29, 33, 34, 35 are actuated to increase or reduce the volume of the mold chambers.

In a further modification of the embodiment of FIG. 2, a universal regulator is substituted for the regulator 42 and may be either electrically or pneumatically operated. The pressures measured by the stress gauge 36 and represented by variations of the current flowing through the stress gauge, produces current pulses which are compared with a preselected desired value, and deviations of the measured values from the desired value produce a signal which is supplied to the control means.

For example, the signal may be an electric impulse which, when exceeding the required value, flows in one direction, and if the desired value is not reached flows in the opposite direction, and whose intensity is proportional to the extent of deviation so that control means 43 is operated at a speed which is increased in accordance with the increase of the deviation of the measured values from the desired preselected value. By incorporating time switches into the circuit, the time difference between the adjustment at the feeding station and the sensing and pressing operations at the operating station can be compensated.

The apparatus of the invention may be used in conjunction with a known sorting machine for automatically discarding tablets whose weight is too high or too low, and which stop the press when a predetermined number of successive tablets have a weight differing by a predetermined amount from the desired weight. This would be the case in the event of disturbances in the feeding of the powdery substances at the feeding station.

It will be understood that each of the elements described above, or two or more together, may also find a useful application in other types of tabletting presses differing from the types described above.

While the invention has been illustrated and embodied in an arrangement for adjusting the volume of mold chambers of a tabletting press when the weight of the compressed tablets varies, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the range of equivalence and meaning of the following claims.

What is claimed as new and desired to be protected by Letters Patent is set forth in the appended claims:

1. Press for making objects of equal weight, comprising, in combination, mold means having a plurality of mold chambers, and including adjusting means for varying the volume of each mold chamber; feeding means for feeding a compressible substance into said mold chambers; press means for compressing the substance in successive mold chambers with a pressure depending on the amount of the substance in the same; pressure responsive sensing means for measuring said pressure and including a pivotally mounted sensing lever, and a roller eccentrically mounted on said sensing lever and successively engaged by each adjusting means, and a spring connected with said sensing lever, the force of said spring being selected so that said sensing lever and said roller are displaced by the adjusting means engaging said roller between a normal position indicating that a desired pressure is applied to said substance in the respective mold chamber, and first and second positions indicating too high and too low pressures; and control means controlled by said sensing lever to operate said adjusting means to increase and reduce the volume of said mold chambers when measured high and low pressures, respectively, indicate an insufficient and an excess amount, respectively, of said substance in said mold chambers whereby compressed objects of equal weight are formed of the substance.

2. Press for making objects of equal weight, comprising, in combination, mold means including a die plate having bores therethrough, and adjusting means for varying the volume of each mold chamber and including counterpressure members projecting into said bores, respectively and forming mold chambers in the same; feeding means for feeding a compressible substance into said mold chambers; press means for compressing the substance in successive mold chambers with a pressure depending on variations of the amount of substance in the same, said press means including presser members movable into said bores, and operating means for the same located at an operating station for operating each presser member at said operating station whereby pressure is transmitted to the counterpressure member at said operating station; pressure responsive sensing means for measuring said pressure, located at said operating station and including a pivotally mounted sensing lever, a roller eccentrically mounted on said lever and engaged by said counterpressure member at said operating station, and a spring connected with said sensing lever, the force of said spring being selected so that said sensing lever is displaced by said counterpressure member between a normal position in which a desired pressure is applied to said substance, and first and second positions indicating too low and too high pressures, respectively, said sensing means including a stop stopping said sensing lever in said first position, said sensing lever being farther spaced from said stop in said second position than in said normal position; and control means including first and second control elements operated by said sensing lever in said first and second position to adjust the positions of said counterpressure members to increase and reduce, respectively, the volume of said mold chambers when sensed low and high pressures indicate, respectively, an insufficient and an excess amount of said substance in said mold chambers so that the amount of said substance in each mold chamber has the same weight whereby compressed objects of equal weight are formed of the substance.

3. An apparatus as claimed in claim 2 wherein said first and second control elements are reversing switches; and wherein said control means include a motor energized by said first and second switches to rotate in opposite directions, guide means for guiding said counterpressure members from said feeding means to said operating station, and transmission means connecting said motor with said guide means so that the same displaces said counterpressure members in said bores.

4. An apparatus as claimed in claim 3 wherein said control means include a circuit connecting said motor with said reversing switches, a control switch connected into said circuit, and means for closing said control switch at the end of the compressing movement of said presser member whereby said motor moves said counterpressure members when said control switch and one of said reversing switches is closed.

5. An apparatus as claimed in claim 4 wherein said circuit includes a short time relay so that said motor is energized for a short time only.

6. Apparatus as claimed in claim 2 comprising means for moving said mold means so that said mold chambers move stepwise; and wherein said control means are controlled by said mold means to operate said adjusting means after said press means have compressed said substance in a mold chamber.

7. Press for making objects of equal weight, comprising, in combination, mold means having a plurality of mold chambers and including adjusting means for varying the volume of said mold chambers; feeding means for feeding a compressible substance into said mold chambers; press means for compressing the substance in successive mold chambers with a pressure depending on variations of the amount of said substance, said press means including a frame and presser members and counter presser members mounted on said frame movable in said mold chambers whereby said frame is subjected to a stress equal to said pressure; pressure-responsive sensing means for measuring said pressure, and including a stress gauge on said frame for measuring said stress and responsive to the same to vary the resistance thereof, and a circuit including a measuring means connected with said stress gauge so that said measuring means measures said stress and said pressure; and control means including reversing switch means and a motor for operating said adjusting means when said measuring means measure a maximum and a minimum pressure, and being controlled by said sensing means to operate said adjusting means to increase and reduce, respectively, the volume of said mold chambers when measured low and high pressures indicate, respectively, an insufficient and an excess amount, respectively, of said substance in said mold chambers so that the amount of said substance in each mold chamber has the same weight whereby compressed objects of equal weight are formed of said substance.

8. Press for making objects of equal weight, comprising, in combination, mold means having a plurality of mold chambers and including adjusting means for varying the volume of said mold chambers; feeding means for feeding a compressible substance into said mold chambers; press means for compressing the substance in successive mold chambers with a pressure depending on variations of the amount of said substance, pressure-responsive sensing means for measuring said pressure, said sensing means including piezoelectric means for sensing the pressure at an operating station; and control means including an electric motor, and circuit means conecting said piezoelectric means with said motor, and being controlled by said sensing means so that said motor operates said adjusting means to increase and reduce, respectively, the volume of said mold chambers when measured low and high pressures indicate, respectively, an insufficient and an excess amount, respectively, of said substance in said mold chambers so that the amount of said substance in each mold chamber has the same weight whereby compressed objects of equal weight are formed of said substance.

9. Press for making objects of equal weight, comprising, in combination, mold means having a plurality of mold chambers and including adjusting means for varying the volume of said mold chambers; feeding means for feeding a compressible substance into said mold chambers; press means for compressing the substance in successive mold chambers with a pressure depending on variations of the amount of said substance; pressure-responsive sensing means for measuring said pressure; and control means controlled by said sensing means to operate said adjusting means to increase and reduce, respectively, the volume of said mold chambers when measured low and high pressures indicate, respectively, an insufficient and an excess amount, respectively, of said substance in said mold chambers so that the amount of said substance in each mold chamber has the same weight whereby compressed objects of equal weight are formed of said substance, said control means including first and second reversing switches operated by said sensing means when sensing too high or too low pressure, a motor energized by said first and second switches to rotate in opposite directions, transmission means connecting said motor with said adjusting means, a control switch connected in series with said first and second reversing switches, a short time relay controlled by said control switch and controlling said motor, and means for closing said control switch at the end of the compressing movement of said press means whereby said motor operates said adjusting means for a short time only when said control switch and one of said reversing switches are closed.

References Cited
UNITED STATES PATENTS

| | | | |
|---|---|---|---|
| 901,937 | 10/1908 | Scott | 107—17 |
| 2,293,815 | 8/1942 | Gates | 100—45X |

WILLIAM F. O'DEA, Primary Examiner

R. I. SMITH, Assistant Examiner

U.S. Cl. X.R.

18—16, 16.5; 25—67; 107—17